No. 611,376. Patented Sept. 27, 1898.
L. D. CRAIG.
SUPPORTER FOR COOKING UTENSILS.
(Application filed June 24, 1898.)
(No Model.)
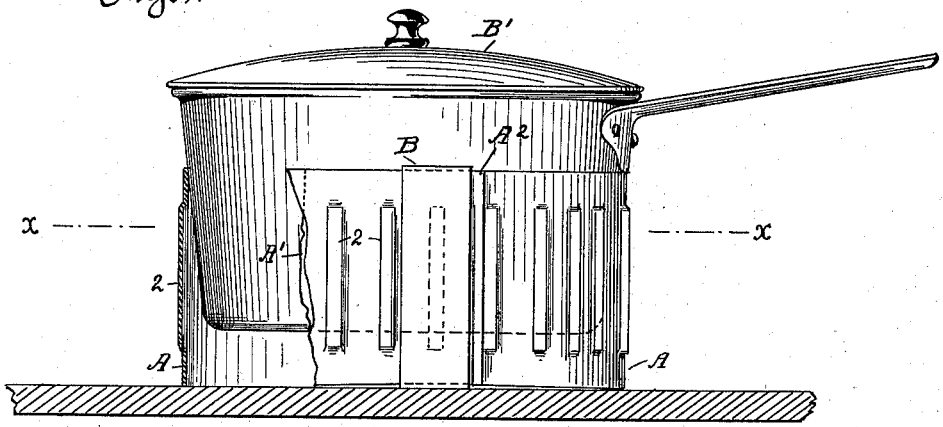
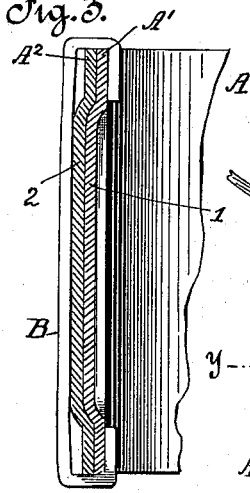
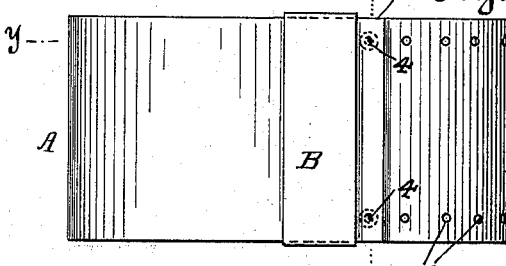
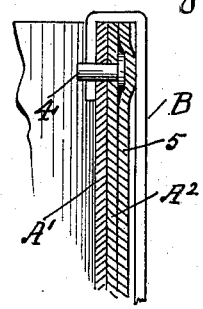
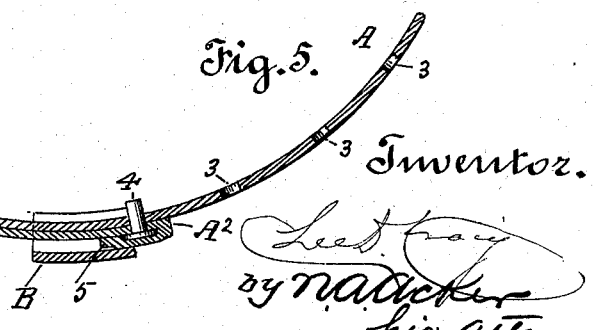
Witnesses.
F. E. Monteverde
Elmer Wickes.
Inventor.
Lee D. Craig
by N. A. Acker
his atty.

UNITED STATES PATENT OFFICE.

LEE D. CRAIG, OF SAN FRANCISCO, CALIFORNIA.

SUPPORTER FOR COOKING UTENSILS.

SPECIFICATION forming part of Letters Patent No. 611,376, dated September 27, 1898.

Application filed June 24, 1898. Serial No. 684,419. (No model.)

*To all whom it may concern:*

Be it known that I, LEE D. CRAIG, a citizen of the United States, residing at San Francisco, in the county of San Francisco and State of California, have invented certain new and useful Improvements in Supporters for Cooking Utensils; and I do hereby declare that the following is a full, clear, and exact description thereof.

The present invention relates to a certain new and useful support for cooking utensils designed more especially for use in connection with what is known as "enameled," "agate," or "mottled" ware cooking vessels; and it consists in the arrangement of parts and details of construction, as will be hereinafter fully set forth in the drawings and described and pointed out in the specification.

The object of the invention is to provide a simple and inexpensive device by means of which the enameled, agate, or mottled ware cooking vessels may be kept or maintained a given distance away and be held from direct contact with the fire or stove in order that cooking or chipping of the enameled or outer coating of the vessel may be prevented, which takes place where the vessel is permitted to rest directly upon the stove or is brought into direct contact with the fire, the device being so constructed that its diameter may be readily and quickly increased, (within certain limits,) so as to adapt the same to vessels of varying diameters, thus enabling one device to be utilized for use in connection with a number of different-sized vessels.

In order to comprehend the invention, reference must be had to the accompanying sheet of drawings, forming a part of this application, wherein—

Figure 1 is a front view in elevation, partly broken away, showing the supporter in place upon a stove and a cooking vessel held therein. Fig. 2 is an enlarged broken top plan sectional view of the supporter, taken on line $x\,x$, Fig. 1. Fig. 3 is a vertical sectional view of the supporter, showing the slide-clamp for holding the same locked. Fig. 4 is a side view in elevation, showing a modification of the supporter. Fig. 5 is a broken top plan sectional view taken on line $y\,y$, Fig. 4; and Fig. 6, an enlarged vertical sectional view, partly broken away, taken on line $y\,y$, Fig. 4.

The supporter consists of a single sheet of metal A, bent into cylindrical form, so that when the ends are united or locked a cylinder is provided. The end sections $A'\,A^2$ of the sheet of metal are preferably stamped with a series of corrugations 1 2, the corrugations 1 fitting within the under faces of corrugations 2 when the section $A'$ lies below that of section $A^2$, Fig. 2. These corrugations thus serve as interlocking teeth, which when the sections are clamped together serve to hold the metallic body against expansion or springing apart. The parts or ends of the sheet A are held interlocked by means of the slide-clamp B, the upper and lower ends of which are flanged or turned over, so as to embrace the sections $A'\,A^2$ when moved toward the end of the overlying section. By simply moving the under section toward or from the end of overlying section $A^2$, so as to place corrugations 1 into engagement with either of the corrugations 2, the diameter of the supporter may be increased or decreased, as desired. After being adjusted to the proper diameter to receive the vessel $B'$ the slide-clamp B is moved outward or toward end of section $A^2$, so as to force the two sections firmly together, in which locked position they will remain until the slide-clamp is moved to release same.

In Figs. 4, 5, and 6 I have shown a modication which consists in providing end section $A'$ with a series of upper and lower holes or openings 3 and connecting to end section $A^2$ two engaging studs or pins 4, which enter into or engage the holes or openings 3. In this case the studs or pins are held to section $A^2$ by turning the end flange 5 back upon the said studs or pins, Figs. 5 and 6. However, I prefer the lock arrangement illustrated by Figs. 1, 2, and 3, owing to its cheapness and simplicity of operation. In either case the slide-clamp operates the same.

Practical use of the device has proven that the height thereof need not exceed four inches, which is sufficient to hold the cooking vessel such a distance from the stove or fire as to prevent the enamel or other covering cracking or chipping and at the same time avoid scorching the contents of the vessel.

Having thus described the invention, what I claim as new, and desire to secure protection in by Letters Patent, is—

1. As a new article a supporter for cooking utensils, consisting of a single piece of metal bent so as to form approximately a cylinder, the ends of which are constructed to interlock one with the other and of a slide-clamp for holding the said sections firmly together.

2. The combination with a supporter for cooking utensils which consists of a single piece of metal bent so as to form approximately a cylinder, of a series of vertical interlocking corrugations formed in each end of the sheet, and of a slide-clamp for holding the ends of the sheet firmly together.

In testimony whereof I affix my signature, in presence of two witnesses, this 18th day of June, 1898.

LEE D. CRAIG.

Witnesses:
N. A. ACKER,
JOHN W. NYE.